United States Patent
Jenne

(10) Patent No.: US 8,028,182 B2
(45) Date of Patent: Sep. 27, 2011

(54) DYNAMIC CPU VOLTAGE REGULATOR PHASE SHEDDING

(75) Inventor: John E. Jenne, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 639 days.

(21) Appl. No.: 12/133,187

(22) Filed: Jun. 4, 2008

(65) Prior Publication Data

US 2009/0307509 A1    Dec. 10, 2009

(51) Int. Cl.
G06F 1/00 (2006.01)
(52) U.S. Cl. .......................... 713/322; 713/300
(58) Field of Classification Search .................. 713/322, 713/340, 300
See application file for complete search history.

(56) References Cited

U.S. PATENT DOCUMENTS

| | | | |
|---|---|---|---|
| 5,627,412 A | 5/1997 | Beard | |
| 6,188,206 B1 | 2/2001 | Nguyen et al. | |
| 6,415,388 B1 * | 7/2002 | Browning et al. | 713/322 |
| 6,425,086 B1 | 7/2002 | Clark et al. | |
| 6,601,179 B1 * | 7/2003 | Jackson et al. | 713/322 |
| 6,678,831 B1 | 1/2004 | Mustafa et al. | |
| 6,823,516 B1 * | 11/2004 | Cooper | 718/108 |
| 6,978,388 B1 * | 12/2005 | Cornelius | 713/320 |
| 7,076,672 B2 * | 7/2006 | Naveh et al. | 713/300 |
| 7,240,223 B2 | 7/2007 | de Cesare et al. | |
| 7,260,731 B1 | 8/2007 | Read et al. | |
| 7,770,042 B2 * | 8/2010 | Gaskins | 713/322 |
| 2003/0204762 A1 * | 10/2003 | Lee et al. | 713/322 |
| 2008/0320322 A1 * | 12/2008 | Green et al. | 713/340 |
| 2009/0256537 A1 * | 10/2009 | Sato et al. | 323/272 |

FOREIGN PATENT DOCUMENTS

WO    WO 9712329 A1 *    4/1997

OTHER PUBLICATIONS

Shiguo Luo, John J. Breen and Hongtao Zhao; Static Phase Shedding For Voltage Regulators Based Upon Circuit Identifiers; filed Apr. 23, 2008; U.S. Appl. No. 12/148,830.
Power Regulator For ProLiant Servers; Feb. 2007; pp. 1-14; Technology Brief, 3rd Edition; Hewlett-Packard Development Company, L.P.
HP.com—ProLiant Management—HP Power Regulator—overview; HP Power Regulator For ProLiant; 2008; pp. 1-2; Hewlett-Packard Development Company, L.P.; http://h18013.www1.hp.com/products/servers/management/ilo/power-regulator.html?jumpi.

(Continued)

*Primary Examiner* — Thomas Lee
*Assistant Examiner* — Xuxing Chen
(74) *Attorney, Agent, or Firm* — Haynes and Boone, LLP

(57) ABSTRACT

A voltage regulator phase shedding system includes one or more subsystems to receive a system management interrupt (SMI), gather processor utilization information, determine whether to adjust a performance state, lookup voltage regulator information for new performance state, adjust active voltage regulator phase, and adjust performance state. The voltage regulator phase shedding system can also include one or more subsystems to read a power measurement, calculate throttling requirements, determine whether to adjust a throttling, lookup voltage regulator information for new performance state capacity, adjust active voltage regulator phase, and adjust throttling.

20 Claims, 4 Drawing Sheets

OTHER PUBLICATIONS

HP.com—ProLiant Remote Management With Lights-Out Technologies (ilo); Remote Management Integrated Lights-Out Products; 2008; pp. 1-2; Hewlett-Packard Development Company, L.P.; http://www.hp.com/cgi-bin/pf-new.cgi?IN=http://h18013.www1.hp.com/products/servers/m.

HP.com—Networking—HP NC373m PCI Express Dual Port Multifunction Gigabit Server; HP NC373m PCI Express Dual Port Multifunction Gigabit Server Adapter Overview; 2008; pp. 1-2; Hewlett-Packard Development Company, L.P.; http://www.hp.com/cgi-bin/pf-new.cgi?IN=http://h18004.www1.hp.com/products/servers/n.

* cited by examiner

DYNAMIC CPU VOLTAGE REGULATOR PHASE SHEDDING

BACKGROUND

The present disclosure relates generally to information handling systems, and more particularly to dynamic central processor unit (CPU) or processor voltage regulator phase shedding.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Processor manufacturers generally support processor performance states (P-states) which are defined by the Advanced Configuration and Power Interface (ACPI) specification. P-states are used to optimize the processor for performance per watt of electricity used. The maximum P-state generally corresponds to the processor's maximum (Pmax) supported operating frequency; whereas the minimum P-state (Pmin) generally corresponds to the processor's minimum supported operating frequency. Processors may support a range of P-states that correspond to frequencies between the minimum and maximum. A secondary effect to P-state transitions is that the processor may also adjust its core voltage to match the new frequency, thus providing additional power savings at lower P-states.

IHS server platforms may support a processor stack with a wide range of power requirements. Thus the processor's voltage regulator should be sized for the highest powered processor. Power management algorithms, may use P-states to manage a processor's performance for a given workload, thus optimizing its power consumption. For example, a processor with 130 watt thermal design power (TDP) could be managed to operate at a significantly lower wattage. Some server platforms may support enhanced power capping capabilities. Processor P-States are one of the main controls the system uses to cap power consumption. Software based P-state capping is possible with both OS and OS-independent P-state management solutions. Processor P-states may be managed by the IHS's operating system (OS). However, it is possible to provide OS-independent P-state management.

Voltage regulator efficiency curves generally show that processors are most efficient under a heavy load and least efficient under a light load. The processor's voltage regulator is generally sized for the highest powered processor that is supported in the system. Thus, power management solutions that manage processor P-states can cause the voltage regulators to operate on the lower part of the efficiency curve. Additionally, power capping by limiting the available processor P-states may cause the voltage regulators to operate on the lower part of the efficiency curve.

Accordingly, it would be desirable to provide an improved dynamic central processor unit (CPU) voltage regulator phase shedding absent the disadvantages discussed above.

SUMMARY

According to an embodiment, a voltage regulator phase shedding system includes one or more subsystems to receive a system management interrupt (SMI), gather processor utilization information, determine whether to adjust a performance state, lookup voltage regulator information for new performance state, adjust active voltage regulator phase, and adjust performance state.

DETAILED DESCRIPTION

For purposes of this disclosure, an IHS 100 includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS 100 may be a personal computer, a network storage device, or any other suitable device and may vary in size, shape, performance, functionality, and price. The IHS 100 may include random access memory (RAM), one or more processing resources such as a central processing unit (CPU) or hardware or software control logic, read only memory (ROM), and/or other types of nonvolatile memory. Additional components of the IHS 100 may include one or more disk drives, one or more network ports for communicating with external devices as well as various input and output (I/O) devices, such as a keyboard, a mouse, and a video display. The IHS 100 may also include one or more buses operable to transmit communications between the various hardware components.

Figure 1:
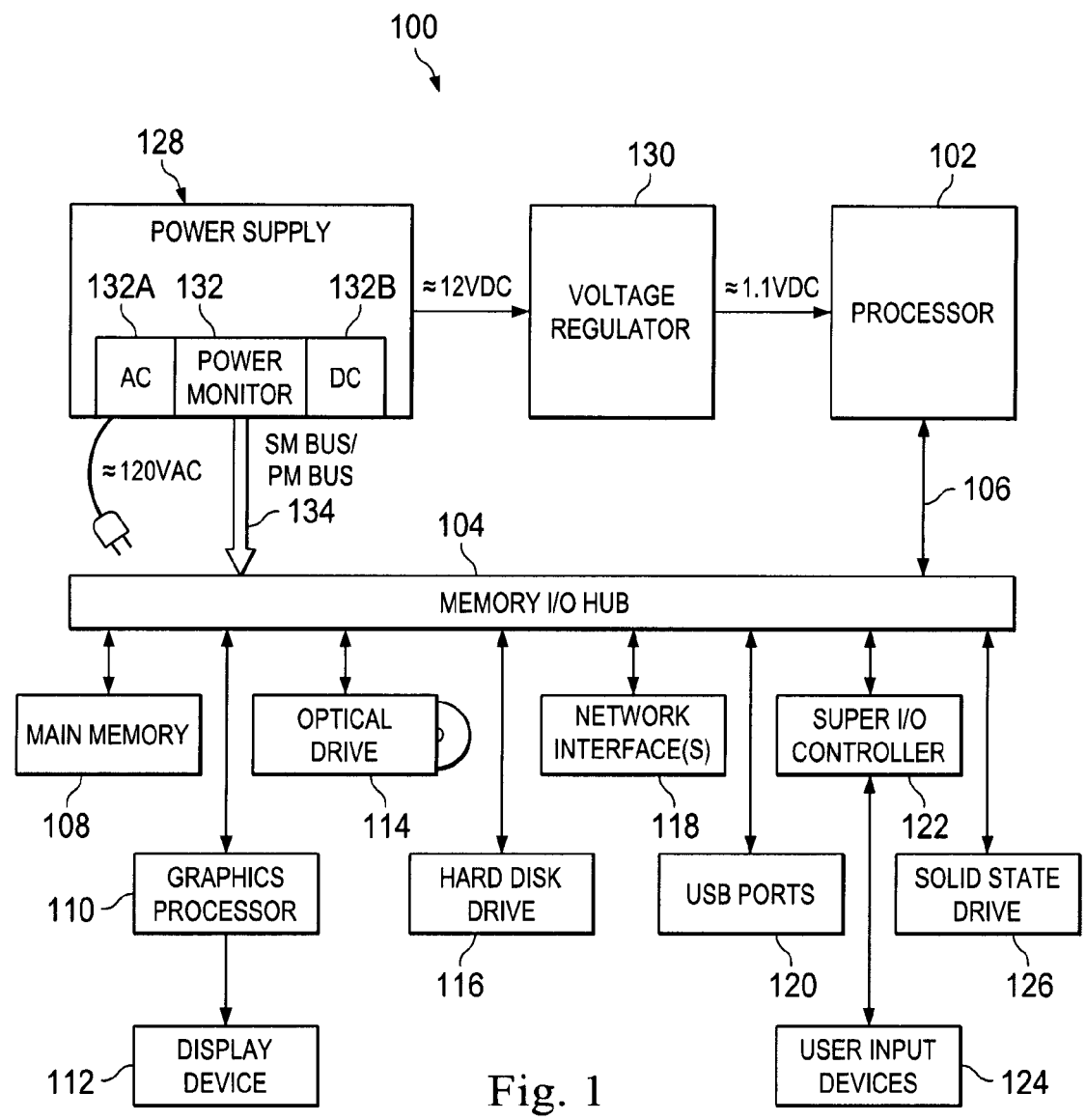
FIG. 1 illustrates an embodiment of an information handling system (IHS).

FIG. 1 is a block diagram of one IHS 100. The IHS 100 includes a processor 102 such as an Intel Pentium™ series processor or any other processor available. A memory I/O hub chipset 104 (comprising one or more integrated circuits) connects to processor 102 over a front-side bus 106. Memory I/O hub 104 provides the processor 102 with access to a variety of resources. Main memory 108 connects to memory I/O hub 104 over a memory or data bus. A graphics processor 110 also connects to memory I/O hub 104, allowing the graphics processor to communicate, e.g., with processor 102 and main memory 108. Graphics processor 110, in turn, provides display signals to a display device 112.

Other resources can also be coupled to the system through the memory I/O hub 104 using a data bus, including an optical drive 114 or other removable-media drive, one or more hard disk drives 116, one or more network interfaces 118, one or more Universal Serial Bus (USB) ports 120, and a super I/O controller 122 to provide access to user input devices 124, etc. The IHS 100 may also include a solid state drive (SSDs) 126 in place of, or in addition to main memory 108, the optical drive 114, and/or a hard disk drive 116. It is understood that any or all of the drive devices 114, 116, and 126 may be located locally with the IHS 100, located remotely from the IHS 100, and/or they may be virtual with respect to the IHS 100.

The IHS 100 of FIG. 1 also includes a power supply 128 and a voltage regulator 130. The power supply 128 receives electrical power and converts the power into a form usable by the voltage regulator 130 to supply power to the processor 102 and possibly to other components of the IHS 100. For example, the power supply 128 may receive alternating current (AC) of approximately 120 volts or 220 volts and convert that into approximately 12 volts direct current (DC). However, it should be understood that the power supply 128 may convert any value/form of electrical energy into any other value/form of electrical energy. The voltage regulator 130 receives the electrical power from the power supply 128 and regulates the power to approximately 1.1 volt DC or any other value for use by the processor 102.

In an embodiment, the power supply 128 may include a power monitor 132. The power monitor 132 may be capable of monitoring characteristics of the electrical power into and/or out of the power supply 128. For example, the power monitor 132 may include an AC monitor 132A for monitoring incoming electrical voltage, current, power used, and a variety of other characteristics of the incoming AC electrical power. Similarly, the power monitor 132 may include a DC monitor 132B for monitoring outgoing electrical voltage, current, power used, and a variety of other characteristics of the outgoing DC electrical power. In an embodiment, the power monitor 132 may communicate information (e.g., electrical power characteristics/calculations) to other components of the IHS 100 via a management bus 134, such as, a system management bus (SMBus), a power management bus (PMBus) and/or a variety of other communication systems. The power monitor 132 may or may not be incorporated into the power supply 128.

Not all IHSs 100 include each of the components shown in FIG. 1, and other components not shown may exist. Furthermore, some components shown as separate may exist in an integrated package or be integrated in a common integrated circuit with other components, for example, the processor 102 and the memory I/O hub 104 can be combined together. As can be appreciated, many systems are expandable, and include or can include a variety of components, including redundant or parallel resources.

The present disclosure provides an embodiment of an architecture that optimizes the processor voltage regulator efficiency for a system with operating system-independent power management and an embodiment of an architecture that optimizes the processor voltage regulator efficiency for a system that is power capped.

In an embodiment, operating system independent power management software many dynamically set the processor P-state in response to the processor's utilization. Reducing the processor P state lowers the processor's power consumption due to the P-state's lower frequency and voltage. In an embodiment, power management software may dynamically limit the highest processor P-state allowed in response to a user-defined power cap. Capping the processor P-state limits the processor's power consumption due to the P-state's lower frequency and voltage.

Figure 2:
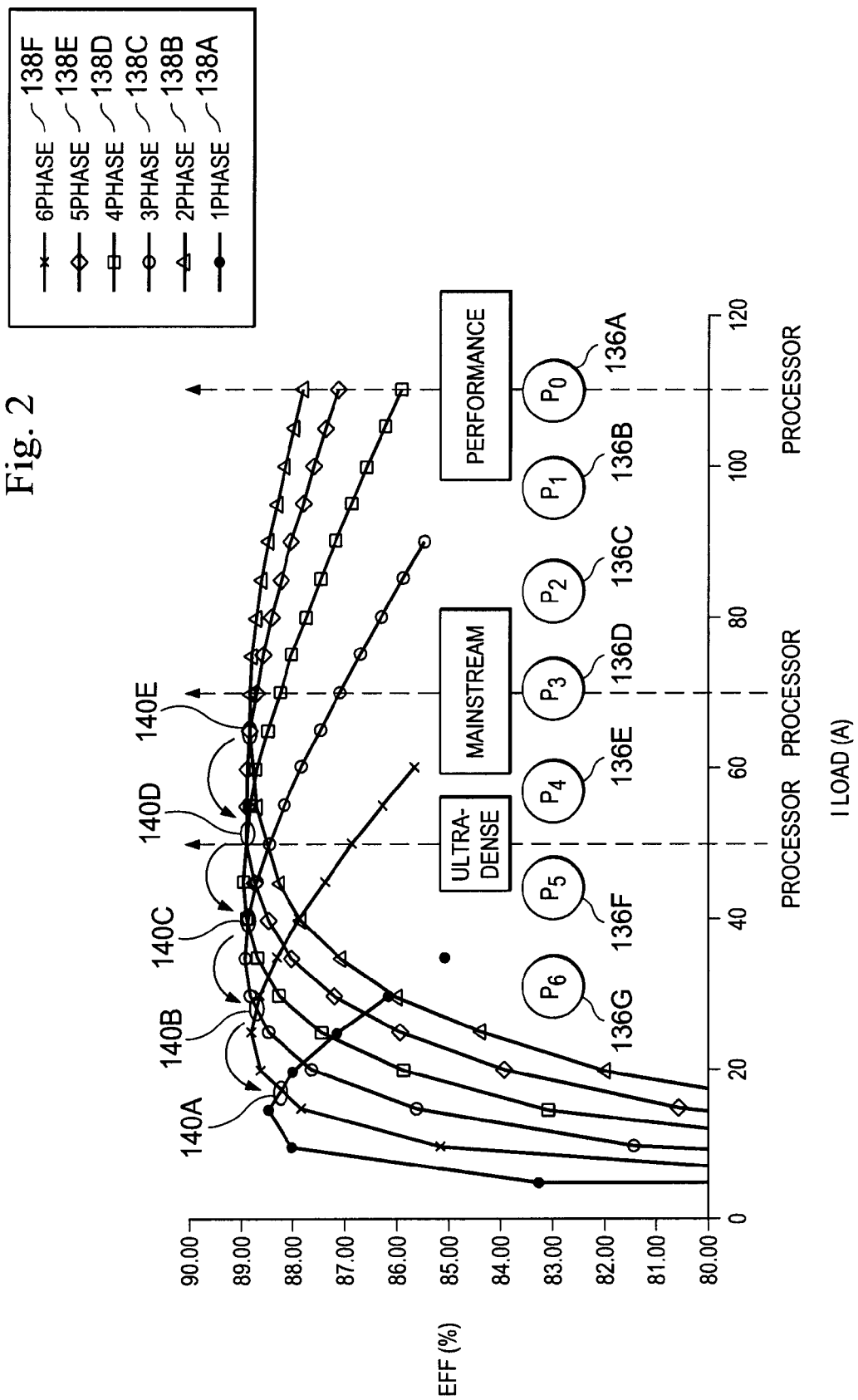
FIG. 2 Illustrates a performance state efficiency chart for phase shedding.

FIG. 2 Illustrates a performance state efficiency chart for phase shedding of a voltage regulator 130. The performance state's approximate operating current is illustrated as performance state 0, P0, 136A; performance state 1, P1, 136B; performance state 2, P2, 136C; performance state 3, P3, 136D; performance state 4, P4, 136E; performance state 5, P5, 136F; performance state 6, P6, 136G. The efficiency curves for operating the voltage regulator 130 at different phases are shown at curves for phase 1, 138A; phase 2, 138B; phase 3, 138C; phase 4, 138D; phase 5, 138E and phase 6 138F. Efficiency curve intersections can be seen at points 140A, 140B, 140C, 140D and 140E. To improve efficiency, it is desirable to operate the voltage regulator 130 at the highest possible points along the efficiency curves 138A-138F. When adding or subtracting a phase of the voltage regulator 130, it is also desirable to transition between the phases at the intersection points 140A-140E of the efficiency curves 138A-138F.

BIOS based P-state management may provide knowledge of the selected P-state. By knowing the P-state, software can determine where the processor is operating on the voltage regulator efficiency curve 138A-138F. Software could then dynamically shed phases of the processor's voltage regulator 130 to match the maximum allowable load. By knowing the power consumption for each supported processor P-state, the system could dynamically shed phases of the processor's voltage regulator to match the maximum allowable load. Reducing the number of active processor voltage regulator phases will shift the load to a higher point on the processor's voltage regulator efficiency curve 138A-138F, thus reducing power consumption.

In an embodiment, control of the processor's P-state transition is utilized because the higher current load associated with a higher P-state may require voltage regulator phases to be enabled. These phases could then be enabled before allowing a higher P-state. Transitioning to a lower P-state is not critical because the number of active voltage regulator phases can support the lighter load. Power management software may control the highest P-state allowed. This may be preset or set by the user. The software algorithm could be modified to support enabling voltage regulator phases before allowing a higher processor P-state.

Figure 3:
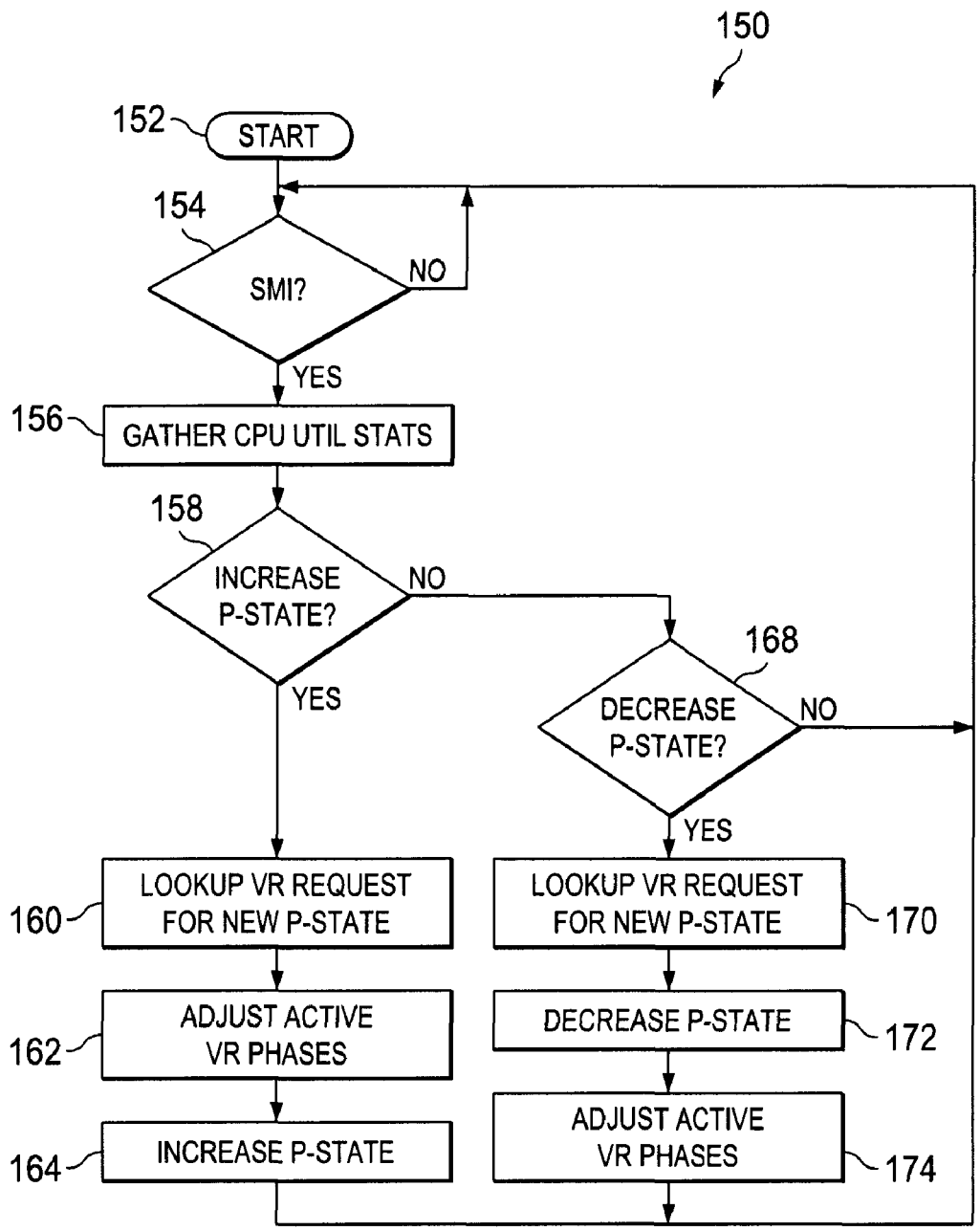
FIG. 3 illustrates a flowchart of an embodiment of a method of basic input/output system (BIOS) power management with processor voltage regulator phase shedding.

FIG. 3 illustrates a flowchart of an embodiment of a method 150 of BIOS power management with processor voltage regulator phase shedding. The method 150 starts at 152 where the IHS 100 is operating. The method 150 then proceeds to decision block 154 where the method 150 determines if a system management interrupt (SMI) or other indication is received indicating that the IHS 100 should change P-states. If no, an SMI or other indication is not received indicating that the IHS 100 should change P-states, the method 150 returns to decision block 154 to await such an interrupt or indication. If yes, an SMI or other indication is received, the method 150 proceeds to block 156 where the method 150 gathers processor 102 utilization statistics or other information that helps the method 150 determine whether to change P-state. In an embodiment, the information may be received from the power monitor 132. The method 150 then proceeds to decision block 158 where the method 150 determines, using the gathered processor 102 information, whether to increase the P-state. If yes, the method 150 determines to increase the P-state, the method 150 proceeds to block 160 where the method 150 looks up or determines (e.g., from a pre-defined table) voltage regulator 130 requirements for a new P-state. The method 150 then proceeds to block 162 where the method 150 adjusts the active voltage regulator phases. Next, the method 150 proceeds to block 164 where the method 150 increases the P-state. The method 150 then returns to decision block 154 awaiting another SMI or indication. On the other hand, if no, the method 150 does not determine to increase the P-state, the method 150 proceeds to decision block 168 where the method 150 determines whether to decrease the P-state. If no, the method 150 does not determine to decrease the P-state, the method 150 returns to decision block 154 awaiting another SMI or indication. If yes, the method 150 determines to decrease the P-state, the method 150 proceeds to block 170 where the method 150 looks up or determines (e.g., from a pre-defined table) voltage regulator 130 requirements for a new P-state. The method 150 then proceeds to block 172 where the method 150 decreases the P-state. Next, the method 150 proceeds to block 174 where the method 150 adjusts the active voltage regulator phases. The method 150 then returns to decision block 154 awaiting another SMI or indication.

Figure 4:
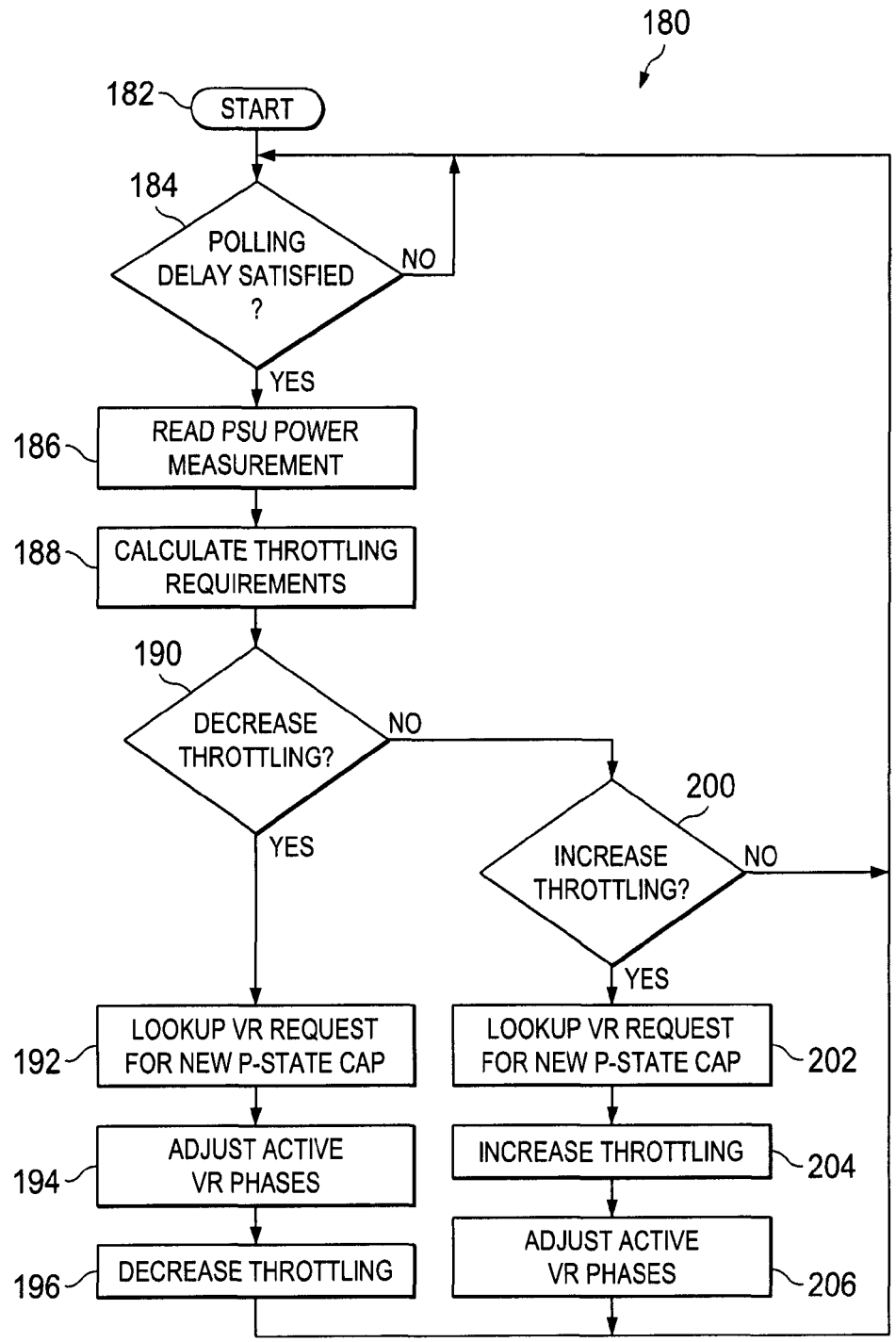
FIG. 4 illustrates a flowchart of an embodiment of a method of power capping with processor voltage regulator phase shedding.

FIG. 4 illustrates a flowchart of an embodiment of a method 180 of power capping with processor voltage regulator phase shedding using a BIOS or an operating system. The method 180 starts at 182 where the IHS 100 is operating. The method 180 then proceeds to decision block 184 where the method 180 determines if a delay for system polling has been satisfied. Polling is generally known as actively sampling the status of a device. If no, and the system polling has not been satisfied, the method 180 returns to decision block 184 to await such polling delay satisfaction. If yes, polling delay has been satisfied, the method 180 proceeds to block 186 where the method 180 reads power supply 128 power measurement information (e.g., actual power usage) or other information that helps the method 180 determine whether to adjust throttling. In an embodiment, the information may be received from the power monitor 132. In an embodiment, the method 180 may read user supplied power cap. The method 180 then proceeds to block 188 where the method calculates power throttling requirements using the information received in block 186. The method 180 then proceeds to decision block 190 where the method 180 determines, using the power measurement, whether to decrease throttling. If yes, the method 180 determines to decrease throttling, the method 180 proceeds to block 192 where the method 180 looks up or determines (e.g., from a pre-defined table) voltage regulator 130 requirements for a new P-state cap. The method 180 then proceeds to block 194 where the method 180 adjusts the active voltage regulator phases. Next, the method 180 proceeds to block 196 where the method 180 decreases throttling. The method 180 then returns to decision block 184 awaiting another polling delay satisfaction. On the other hand, if no, the method 180 does not determine to decrease throttling, the method 180 proceeds to decision block 200 where the method 180 determines whether to increase throttling. If no, the method 180 does not determine to increase throttling, the method 180 returns to decision block 184 awaiting another polling delay satisfaction. If yes, the method 180 determines to increase throttling, the method 180 proceeds to block 202 where the method 180 looks up or determines (e.g., from a pre-defined table) voltage regulator 130 requirements for a new P-state cap. The method 180 then proceeds to block 204 where the method 180 increases throttling. Next, the method 180 proceeds to block 206 where the method 180 adjusts the active voltage regulator phases. The method 180 then returns to decision block 184 awaiting another polling delay satisfaction.

It should be readily understood by one having ordinary skill in the art that voltage regulator 130 solutions with control via discrete signals and/or management bus 134 (e.g., PMBus/SMbus) commands are available as described in the present disclosure. As such, this disclosure does not address the controls to enable or disable voltage regulator 130 phases.

The present disclosure includes both operating system based power management solution by managing processor 102 voltage regulator 130 phases in addition to managing processor 102 P-states. The fine control of the voltage regulator 130 phases may provide additional power savings, which can significantly reduce operation costs for large installations.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A voltage regulator phase adjustment system comprising one or more subsystems to:
    determine a first performance state (P-state) of a processor;
    use the first P-state to determine that a load of the processor is located at a first efficiency point on a voltage regulator efficiency curve; and
    shed at least one active processor voltage regulator phase, wherein, in response to the shedding, the load of the processor shifts to a second efficiency point on the voltage regulator efficiency curve that includes a higher efficiency relative to the first efficiency point.

2. The phase adjustment system of claim 1, wherein the voltage regulator efficiency curve includes a plurality of efficiency curves.

3. The phase adjustment system of claim 1, wherein the second efficiency point on the voltage regulator efficiency curve provides a lower power consumption of the processor relative to the first efficiency point.

4. The phase adjustment system of claim 1, further comprising one or more subsystems to:
    determine that the processor is switching to a second P-state that includes a higher load than the first P-state; and
    use the voltage regulator efficiency curve to determine that the system will operate more efficiently at the higher load relative to the first P-state if at least one additional active processor voltage regulator phase is enabled and, in response, enabling the at least one additional active processor voltage regulator phase.

5. The phase adjustment system of claim 4, further comprising one or more subsystems to:
    switch the processor to the second P-state subsequent to enabling the at least one active processor voltage regulator phase.

6. The phase adjustment system of claim 1, further comprising one or more subsystems to:
    determine a maximum allowable load for the first P-state, wherein the shedding at least one active processor voltage regulator phase is performed to according to the maximum allowable load.

7. An information handling system (IHS) comprising:
    a processor;
    memory coupled to the processor; and
    a voltage regulator coupled to the processor, wherein the voltage regulator includes a voltage regulator phase adjustment system further comprising one or more subsystems to:

receive an indication that the processor is switching from a first performance state (P-state) to a second P-state;

determine, using a load increase of the processor that is associated with the switch from the first P-state to the second P-state, that the voltage regulator will operate more efficiently at the second P-state relative to the first P-state if at least one additional active processor voltage regulator phase is enabled and, in response, enable the at least one active processor voltage regulator phase of the voltage regulator; and switch the processor from the first P-state to the second P-state subsequent to enabling the at least one active processor voltage regulator phase.

8. The IHS of claim 7, further comprising one or more subsystems to:

determine a third performance P-state of the processor;

use the third P-state to determine that the load of the processor is located at a first efficiency point on a voltage regulator efficiency curve; and shed at least one active processor voltage regulator phase, wherein, in response to the shedding, the load of the processor shifts to a second efficiency point on the voltage regulator efficiency curve that includes a higher efficiency relative to the first efficiency point.

9. The IHS of claim 7, further comprising one or more subsystems to:

determine a maximum allowable load for the third P-state, wherein the shedding at least one active processor voltage regulator phase is performed according to the maximum allowable load.

10. A method to adjust voltage regulator phases, the method comprising:

determining a first performance state (P-state) of a processor;

using the first P-state to determine that a load of the processor is located at a first efficiency point on a voltage regulator efficiency curve; and shedding at least one active processor voltage regulator phase, wherein, in response to the shedding, the load of the processor shifts to a second efficiency point on the voltage regulator efficiency curve that includes a higher efficiency relative to the first efficiency point.

11. The method of claim 10, further comprising:

determining that the processor is switching to a second P-state that includes a higher load than the first P-state; and using the voltage regulator efficiency curve to determine that the system will operate more efficiently at the higher load relative to the first P-state if at least one additional active processor voltage regulator phase is enabled and, in response, enabling the at least one additional active processor voltage regulator phase.

12. The method of claim 11, further comprising:

switching the processor to the second P-state subsequent to enabling the at least one active processor voltage regulator phase.

13. A voltage regulator phase adjustment system comprising one or more subsystems to:

read a power measurement;

calculate throttling requirements using the power measurement;

determine voltage regulator phase efficiency information based on the throttling requirements;

adjust at least one active voltage regulator phase using the voltage regulator phase efficiency information that is based on the throttling requirements; and perform a throttling operation according to the throttling requirements subsequent to adjusting the at least one active voltage regulator phase.

14. The phase adjustment system of claim 13, wherein the throttling requirements comprise increasing the throttling.

15. The phase adjustment system of claim 14, wherein the adjusting the at least one active voltage regulator phase comprises shedding at least one active voltage regulator phase in response to the increased throttling requirements.

16. The phase adjustment system of claim 13, wherein the throttling requirements comprises decreasing the throttling.

17. The phase adjustment system of claim 16, wherein the adjusting the at least one active voltage regulator phase comprises enabling at least one active voltage regulator phase in response to the decreased throttling requirements.

18. The phase adjustment system of claim 13, wherein the system is controlled using a basic input/output system (BIOS).

19. The phase adjustment system of claim 13, wherein the system is controlled using an operating system.

20. The phase adjustment system of claim 13, wherein the system is controlled using a basic input/output system (BIOS) and an operating system.

* * * * *